(12) United States Patent
Pregler et al.

(10) Patent No.: US 12,021,181 B2
(45) Date of Patent: Jun. 25, 2024

(54) SYSTEM AND METHOD FOR REDUCING ELECTRICAL INTERFERENCE OF A BATTERY CELL

(71) Applicant: Apple Inc., Cupertino, CA (US)

(72) Inventors: Katherine I. Pregler, Santa Clara, CA (US); Kyle Tse, Fremont, CA (US); Samantha K. Young, San Francisco, CA (US); Jason W. Brinsfield, Mountain View, CA (US); Mei Zhang, Danbury, CT (US); Charles Greenlee, Sunnyvale, CA (US); Kevin R. Richardson, Sunnyvale, CA (US); Susheel Teja Gogineni, Santa Clara, CA (US); Ethan L. Huwe, Sunnyvale, CA (US); Connor R. Duke, Sunnyvale, CA (US); Michael B. Nussbaum, Santa Cruz, CA (US); Shawn G. Fink, Sunnyvale, CA (US); Kirill Kalinichev, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 410 days.

(21) Appl. No.: 17/018,102

(22) Filed: Sep. 11, 2020

(65) Prior Publication Data

US 2021/0083315 A1    Mar. 18, 2021

Related U.S. Application Data

(60) Provisional application No. 62/939,449, filed on Nov. 22, 2019, provisional application No. 62/900,259, filed on Sep. 13, 2019.

(51) Int. Cl.
*H01M 10/04* (2006.01)
*H01M 50/169* (2021.01)
*H01M 50/598* (2021.01)

(52) U.S. Cl.
CPC ..... *H01M 10/0431* (2013.01); *H01M 50/169* (2021.01); *H01M 50/598* (2021.01)

(58) Field of Classification Search
None
See application file for complete search history.

(56) References Cited

U.S. PATENT DOCUMENTS

| 2011/0111267 A1* | 5/2011 | Van Schyndel | H01M 50/531 429/10 |
| 2011/0262779 A1* | 10/2011 | Maleki | H01M 50/533 429/10 |
| 2016/0329615 A1* | 11/2016 | Bergmann | H01M 10/482 |

* cited by examiner

*Primary Examiner* — Amanda J Barrow
(74) *Attorney, Agent, or Firm* — BakerHostetler

(57) ABSTRACT

The disclosed technology relates to a battery utilizing an indicator to orient an unopposed portion of a cathode or anode with respect to a battery can, and a tag to generate an electromagnetic field to mitigate or eliminate an electromagnetic field generated by the unopposed portion of the cathode or anode. The battery includes a wound set of layers including a cathode, an anode, and a separator; a can housing the wound set of layers; a lid disposed atop of the can to enclose the wound set of layers within the can; and a tag coupled to the lid. An unopposed portion of the cathode or anode generates a first electromagnetic field. The tag generates a second electromagnetic field to oppose the first electromagnetic field.

20 Claims, 6 Drawing Sheets

SYSTEM AND METHOD FOR REDUCING ELECTRICAL INTERFERENCE OF A BATTERY CELL

PRIORITY

This application claims the benefit under 35 U.S.C. § 119(e) of U.S. Provisional Patent Application Ser. No. 62/900,259, entitled "SYSTEM AND METHOD FOR REDUCING ELECTRICAL INTERFERENCE OF A BATTERY CELL," filed on Sep. 13, 2019, and U.S. Provisional Patent Application Ser. No. 62/939,449, entitled "SYSTEM AND METHOD FOR REDUCING ELECTRICAL INTERFERENCE OF A BATTERY CELL," filed on Nov. 22, 2019, each of which is incorporated herein by reference in its entirety.

TECHNICAL FIELD

The present disclosure relates generally to a battery, and more particularly, to a battery utilizing a tag to oppose electrical interference generated by a portion of a cathode or an anode of a battery cell.

BACKGROUND

Batteries are used to provide power to a wide variety of portable electronic devices, including laptop computers, tablet computers, mobile phones, personal digital assistants (PDAs), digital music players, watches, and wearable devices. A commonly used type of battery is a lithium battery, which can include a lithium-ion or a lithium-polymer battery.

Lithium batteries often include cells that are made of an anode layer and a cathode layer, with a separator disposed there-between. The layers may be packaged or wound in an enclosure. A first conductive tab may be coupled to one of the cathode or anode layer and a second conductive tab may be coupled to the other of the anode or cathode layer. The first conductive tab may be electrically coupled to a lid of the enclosure and the second conductive tab may be electrically coupled to a wall of the enclosure where the enclosure is itself, made of a conductive material.

In one example, the cathode layer may have a portion extending between the second conductive tab of the anode layer and the first conductive tab of the cathode layer. When the cathode layer and the anode layer are wound, an unopposed portion of the cathode layer may generate electromagnetic interference that is unopposed because the unopposed portion extends beyond the second conductive tab of the anode layer. In another example, the anode layer may have a portion extending between the first conductive tab of the cathode layer and the second conductive tab of the anode layer. When the anode layer and the cathode layer are wound, an unopposed portion of the anode layer may generate electromagnetic interference that is unopposed because the unopposed portion extends beyond the first conductive tab of the cathode layer. The electromagnetic interference generated by the unopposed portion of the cathode or anode layer may produce unwanted noise or signal distortion to other components adjacent to the battery. In addition, when layers are wound and inserted within an enclosure, an assembler is unable to ascertain an orientation of the first and second conductive tabs with respect to the enclosure, thereby making orientation of the conductive tabs with respect to other system components difficult. Accordingly, there is a need for certain embodiments of a battery that is designed to oppose or effectively cancel electromagnetic interference generated by an unopposed portion of a cathode or anode layer and/or electromagnetic interference generated by other system components, as well as an enclosure that enables an assembler to ascertain an orientation of a first and second conductive tab with respect to a feature of the enclosure.

SUMMARY

The disclosed embodiments provide for a battery that utilizes a tag to oppose an electromagnetic interference generated by an unopposed portion of a cathode or anode. The battery includes a wound set of layers having a cathode, an anode, and a separator disposed between the cathode and the anode. The battery further includes a can housing the wound set of layers and a lid disposed atop of the can to enclose the wound set of layers within the can. A first tab extends from one of the cathode and anode and is coupled to the lid. A second tab extends from the other of the cathode and anode and is coupled to the can. The battery also includes a tag coupled to the lid. An unopposed portion of the cathode or anode generates a first electromagnetic field, and the tag generates a second electromagnetic field that opposes the first electromagnetic field.

In some embodiments, a portable electronic device utilizes a tag to oppose an electromagnetic interference generated by an unopposed portion of a cathode or anode and a component of the portable electronic device. The portable electronic device includes a battery having a wound set of layers comprising a cathode, an anode, and a separator disposed between the cathode and the anode. The battery also includes a can housing the wound set of layers and a lid disposed atop of the can to enclose the wound set of layers within the can. A first tab extends from one of the cathode and anode and is coupled to the lid. A second tab extends from the other of the cathode and anode and is coupled to the can. The battery further includes a tag coupled to the lid. An unopposed portion of the cathode or anode generates a first electromagnetic field. The tag generates a second electromagnetic field. An electrical component disposed adjacent to the battery cell generates a third electromagnetic field. The second electromagnetic field generated by the tag opposes the first electromagnetic field and the second electromagnetic field.

In some embodiments, a method for opposing an electromagnetic field generated by an unopposed portion of a cathode or anode is disclosed. The method includes disposing a wound set of layers within a can, the set of layers having a cathode, an anode, and a separator disposed between the cathode and the anode. The method further includes coupling a first tab extending from one of the cathode and anode to a lid; coupling a second tab extending from the other of the cathode and anode to the can; sealing the wound set of layers within the can using the lid; and coupling a tag to the lid. An unopposed portion of the cathode or anode generates a first electromagnetic field. The tag generates a second electromagnetic field that opposes the first electromagnetic field.

BRIEF DESCRIPTION OF THE DRAWINGS

The embodiments herein may be better understood by referring to the following description in conjunction with the accompanying drawings in which like reference numerals indicate identical or functionally similar elements. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the limitations of conventional batteries by utilizing a tag to generate an opposing electromagnetic field to oppose or effectively cancel electromagnetic interference generated by an unopposed portion of a cathode or anode layer and/or electromagnetic interference generated by other system components. In addition, the disclosed technology addresses the limitations of conventional batteries by utilizing an indicator to key conductive tabs of a cathode and anode layer, to an enclosure of a battery cell.

Figure 1A:
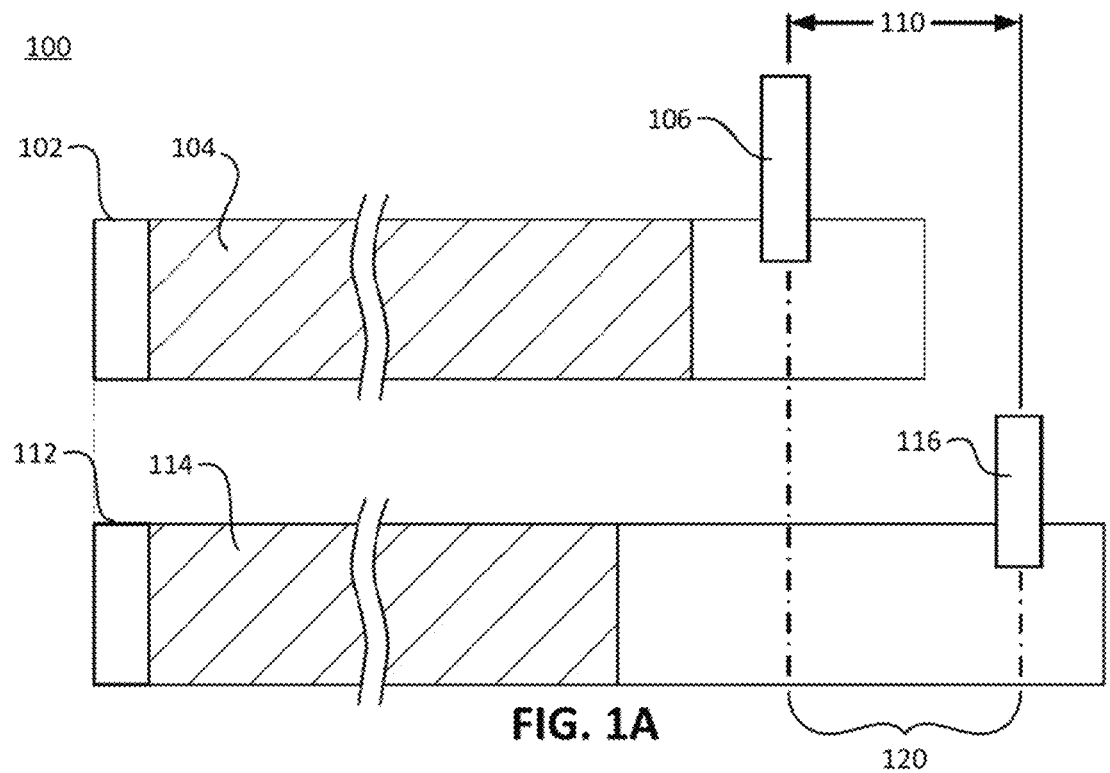
FIG. 1A illustrates a top view of an unwound set of layers, in accordance with various embodiments of the subject technology.

FIG. 1A illustrates a top view of an unwound set of layers 100, in accordance with various embodiments of the subject technology. The set of layers 100 comprise an anode 102 with an active coating 104 disposed on a foil and a cathode 112 with an active coating 114 disposed on a foil. A first conductive tab 116 may be electrically coupled to the cathode 112 and a second conductive tab 106 may be electrically coupled to the anode 102. Each of the anode 102 and the cathode 112 have different lengths to prevent shorting of the first tab 116 and the second tab 106. For example, the anode 102 may have a length that is less than a length of the cathode 112. A distance 110 between the first tab 116 and the second tab 106 may define a portion 120 of the cathode 112 that when wound with the anode 102, results in the portion 120 having current flowing there-through that is unopposed.

Figure 1B:
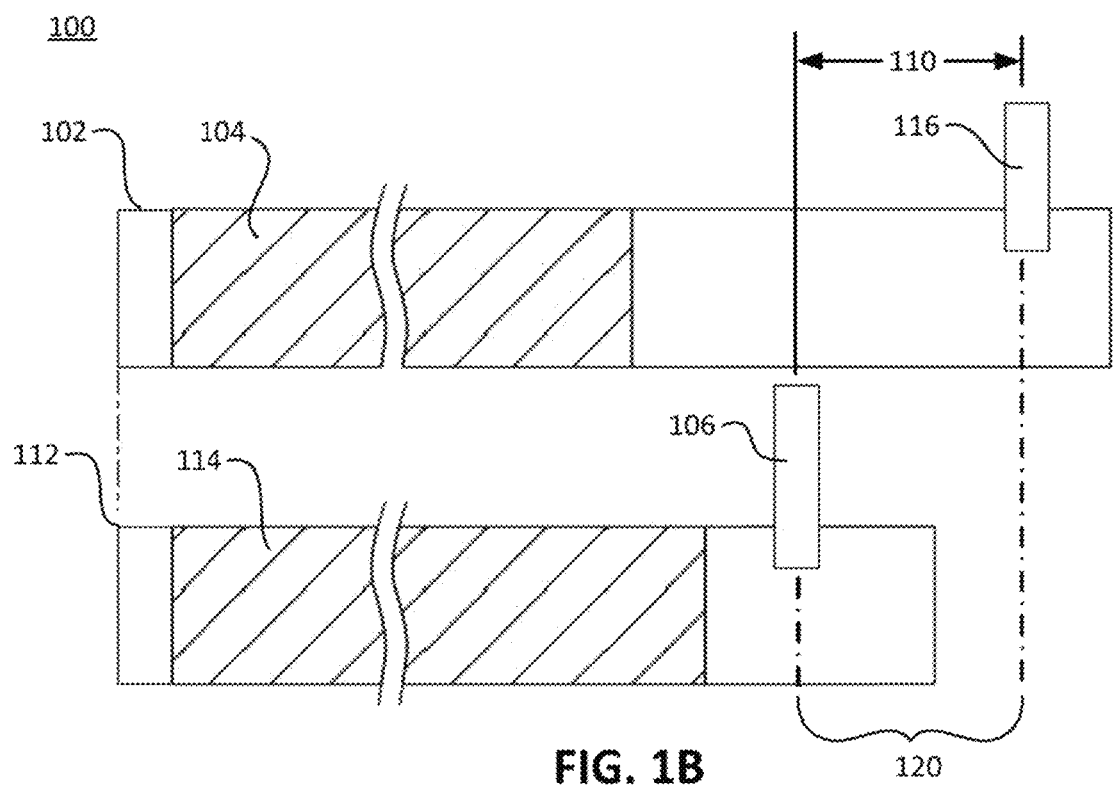
FIG. 1B illustrates a top view of an unwound set of layers, in accordance with various embodiments of the subject technology.

FIG. 1B illustrates a top view of an unwound set of layers 100, in accordance with various embodiments of the subject technology. In another example, the cathode 112 may have a length that is less than a length of the anode 102. In this example, the first conductive tab 116 may be electrically coupled to the anode 102 and the second conductive tab 106 may be electrically coupled to the cathode 112. The anode 102 and the cathode 112 have different lengths to prevent shorting of the first tab 116 and the second tab 106. For example, the anode 102 may have a length that is more than a length of the cathode 112. The distance 110 between the first tab 116 and the second tab 106 may define a portion 120 of the anode 102 that when wound with the cathode 112, results in the portion 120 having current flowing there-through that is unopposed.

Figure 2:
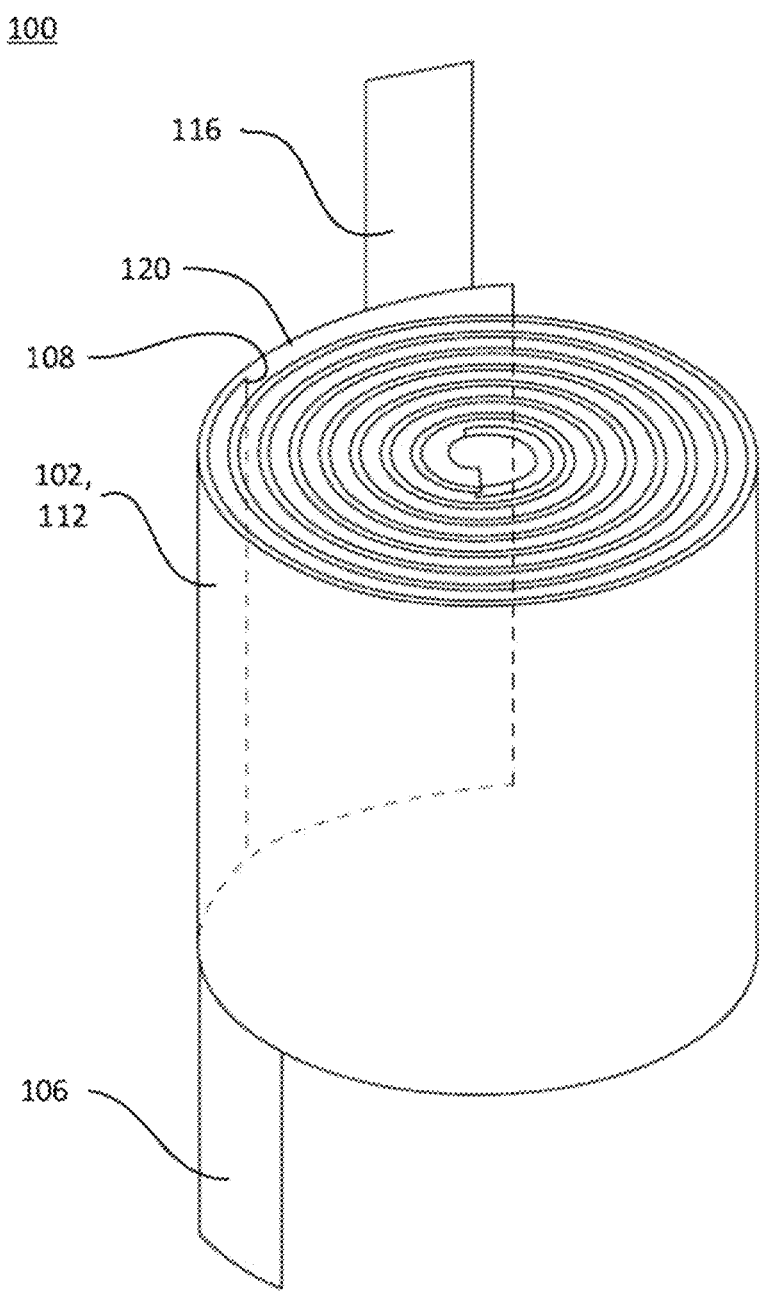
FIG. 2 a perspective view of a wound set of layers, in accordance with various embodiments of the subject technology.

FIG. 2 a perspective view of a wound set of layers 100, in accordance with various embodiments of the subject technology. The set of layers 100 may comprise the anode 102, the cathode 112 and a separator disposed between the cathode and the anode. As shown, the first tab 116 extends from one of the cathode 112 and anode 102, and the second tab 106 extends from the other of the cathode 112 and anode 102. In other portions of the cathode 112 where the anode 102 overlaps with the cathode 112, current flowing through the cathode 112 in a first direction generates an electromagnetic field, while current flowing in a second opposite direction through the anode 102 generates an opposing electromagnetic field, effectively mitigating or eliminating the electromagnetic fields generated by the cathode 112 and the anode 102 due to destructive interference.

In one example, where the cathode 112 has a length that is greater than a length of the anode 102, the portion 120 of the cathode 112 extends beyond an end 108 of the anode 102. Because the portion 120 extends beyond the end 108 of the anode 102, the current flowing through the portion 120 is unopposed. That is, because the anode 102 does not surround or overlap with the unopposed portion 120 of the cathode 112, the current flowing through the unopposed portion 120 generates an electromagnetic field that is not canceled or mitigated by an opposing current flowing through the anode 102.

In another example, where the anode 102 has a length that is greater than a length of the cathode 112, the portion 120 of the anode 102 extends beyond an end 108 of the cathode 112. Because the portion 120 extends beyond the end 108 of the cathode 112, the current flowing through the portion 120 is unopposed. That is, because the cathode 112 does not surround or overlap with the unopposed portion 120 of the anode 102, the current flowing through the unopposed portion 120 generates an electromagnetic field that is not canceled or mitigated by an opposing current flowing through the cathode 112.

Figure 3A:
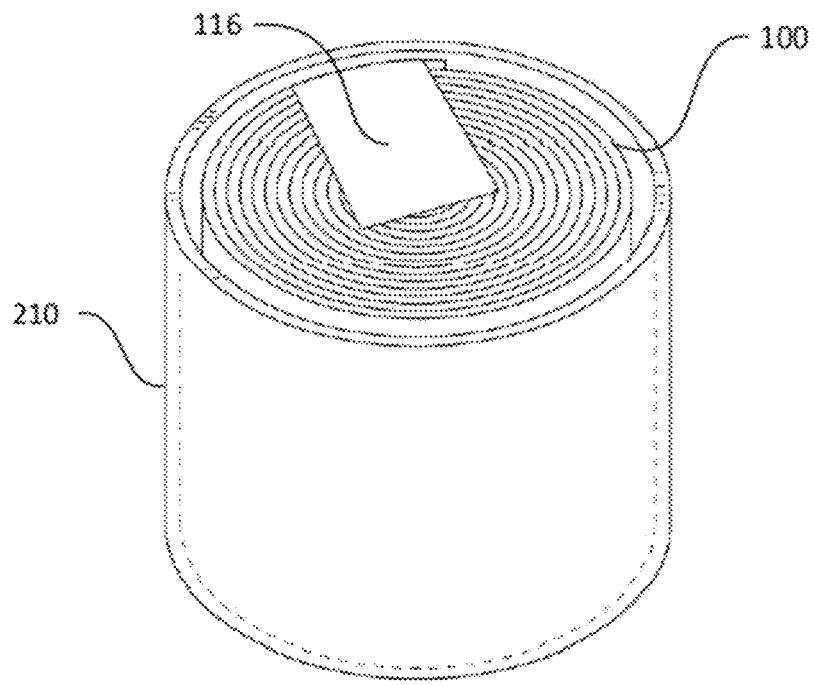
FIG. 3A illustrates a perspective view of a wound set of layers inserted within a can, in accordance with various embodiments of the subject technology.

FIG. 3A illustrates a perspective view of a wound set of layers 100 inserted within a can 210, in accordance with various embodiments of the subject technology. The set of layers 100 may be housed or packaged within an enclosure or can 210. The can 210 may comprise a rigid material, such as a metal or alloy, having a shape with an opening to enable insertion of the set of layers 100 within the can 210. The can 210 may, for example, comprise a cup having a cylindrical sidewall and a base. As shown, the first tab 116 may be disposed proximal to an opening of the can 210.

Figure 3B:
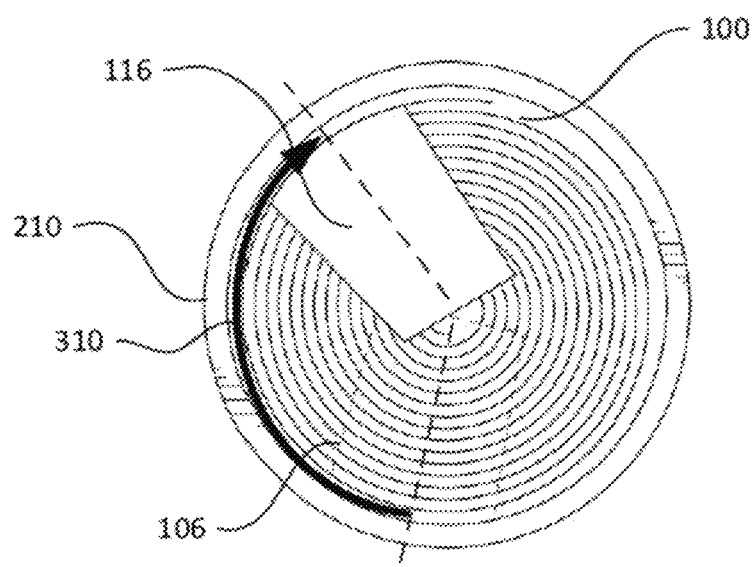
FIG. 3B illustrates a top view of a wound set of layers inserted within a can, in accordance with various embodiments of the subject technology.

FIG. 3B illustrates a top view of a wound set of layers 100 inserted within a can 210, in accordance with various embodiments of the subject technology. Between the first tab 116 and the second tab 106, a current 310 flows through the unopposed portion of the cathode or anode in a first direction.

Figure 4:
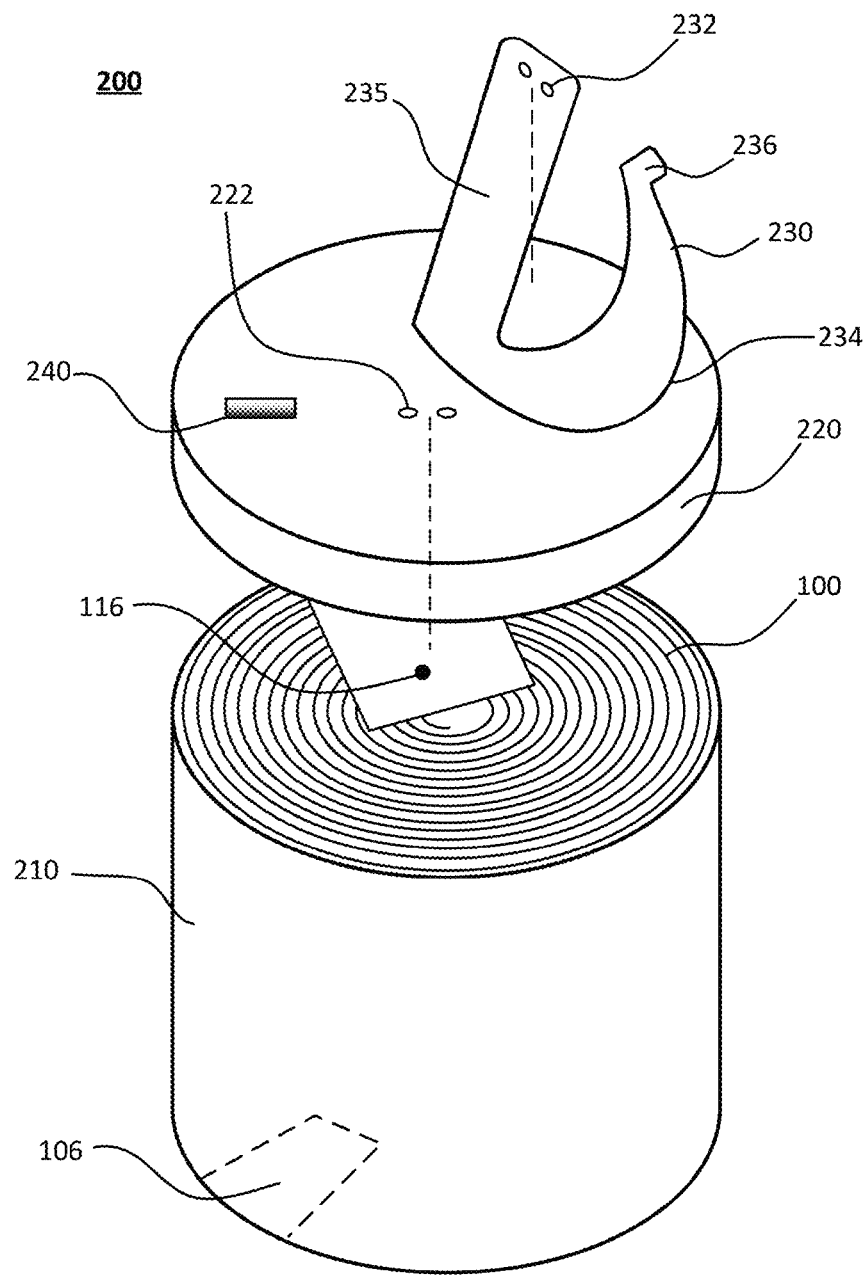
FIG. 4 illustrates an exploded perspective view of a battery, in accordance with various embodiments of the subject technology.

FIG. 4 illustrates an exploded perspective view of a battery 200, in accordance with various embodiments of the subject technology. The battery comprises the set of layers 100, can 210, and a lid 220. The lid 220 may comprise a cap that is configured to engage and be mechanically coupled to the can 210. The lid 220 is disposed atop of the can 210 to thereby enclose the set of layers 100 within the can 210. For example, the lid 220 may be welded to the can 210 to hermetically seal the set of layers 100 within the can 210. The first tab 116 extending from one of the cathode and anode may be coupled to the lid 220 via a weld 222. The second tab 106 extending from the other of the cathode and anode may be coupled to the can 210 via a weld to an inner surface of the can 210.

In one aspect, the lid 220 comprises an indicator 240 that provides a reference point for correlating an orientation of the first tab 116 and the second tab 106 with respect to the can 210. The indicator 240 thus identifies a location of the unopposed portion (e.g., portion 120 of FIGS. 1 and 2) with respect to the can 210. The indicator 240 may comprise at least one of an indent, mark, and scribe on the lid 220. For example, the indicator 240 may be positioned on an opposite side of the unopposed portion. In another example, the indicator 240 may be positioned on the same side as the unopposed portion. In yet another example, the indicator 240 may be positioned at a particular distance or angle away from the unopposed portion. It is understood that the indicator 240 may be positioned on the lid 220 at any location, so long as the location of the indicator 240 corresponds to a location or position of the unopposed portion. In some aspects, by utilizing the indicator 240 to indicate where the unopposed portion is located within the can 210, the battery 200 may be rotated or orientated within a device to locate the unopposed portion away from other components that may be sensitive to an electromagnetic field generated by the unopposed portion.

The battery 200 also comprises a tag 230 coupled to the lid 220 at a weld 232. The tag 230 is formed of a conductive material, such as a metal or alloy, and has a shape that is configured to route current flowing there-through in a direction that generates an electromagnetic field to oppose the electromagnetic field generated by the unopposed portion. The tag 230 is coupled to the lid 220 via the weld 232 at a first end and provides a terminal 236 at a second end of the tag 230 that is located opposite the first end of the tag 230. The terminal 236 is configured to connect to a system component, such as a printed circuit board or connector. In one aspect, the terminal 236 extends beyond a periphery of the lid 220 to force current to flow through the first tab 116, through the weld 222, to the lid 220, through the weld 232, through the tag 230, and to the terminal 236. The tag 230 comprises a curved region 234 disposed between the first and second ends of the tag 230. The tag 230 may also comprise an elongated region 235 disposed between the first and second ends, and more particularly between the first end of the tag 230 and the curved region 234.

Figure 5A:
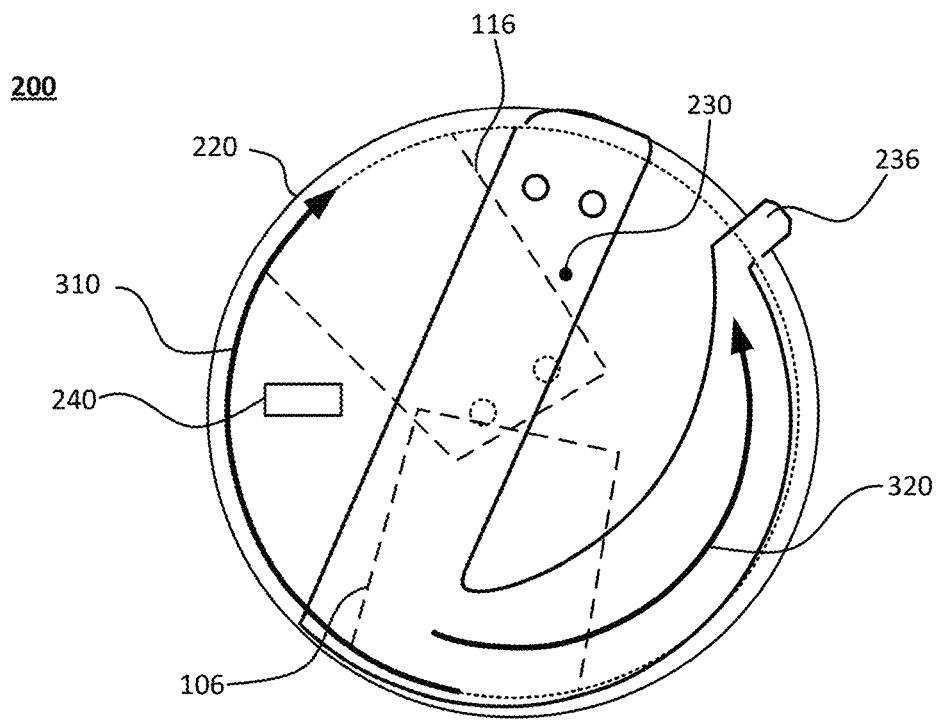
FIG. 5A illustrates a top view of a battery, in accordance with various embodiments of the subject technology.

FIG. 5A illustrates a top view of a battery 200, in accordance with various embodiments of the subject technology. The tag 230 is coupled to the lid 220 and provides the terminal 236 at an end of the tag 230. As shown, the indicator 240 is located on an opposite side of the unopposed portion of the cathode or anode, defined as the portion of the cathode or anode located between the first tab 116 and the second tab 106. The current 310 flowing through the unopposed portion generates a first electromagnetic field. The current 320 flowing through the tag 230 generates a second electromagnetic field. In one aspect, the second electromagnetic field opposes the first electromagnetic field to effectively cancel or mitigate electromagnetic interference.

Figure 5B:
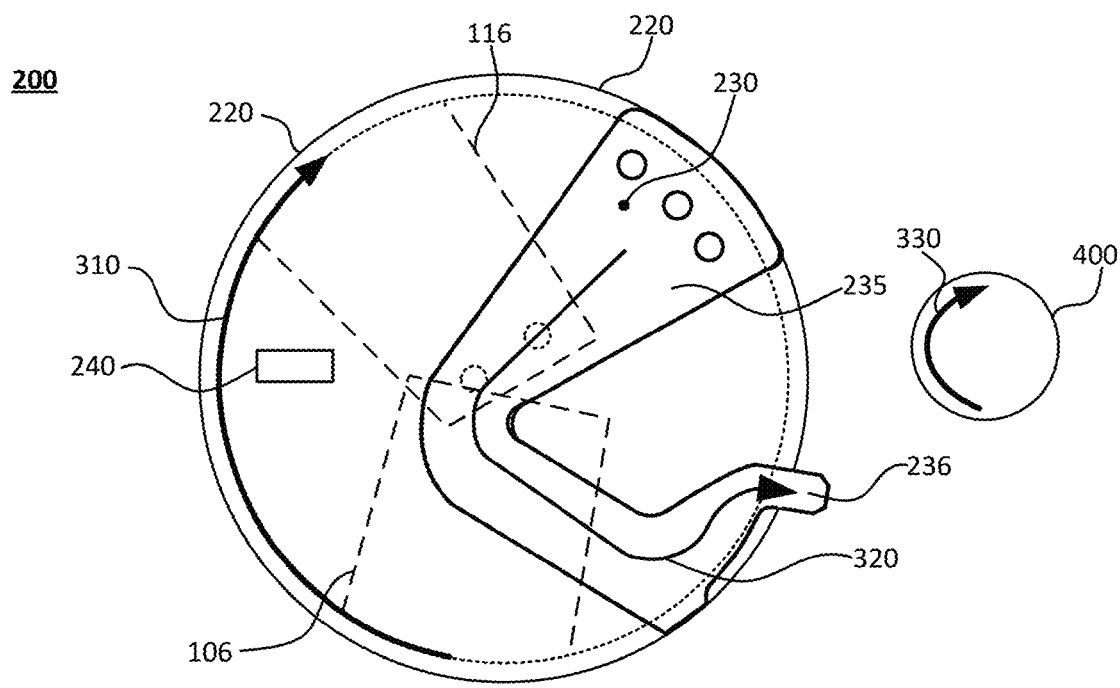
FIG. 5B illustrates a top view of a battery, in accordance with various embodiments of the subject technology.

FIG. 5B illustrates a top view of a battery 200, in accordance with various embodiments of the subject technology. In one aspect, a shape of the tag 230 may be modified or altered to generate an opposing electromagnetic field. In another aspect, a width of the tag 230 may be increased to produce a weaker electromagnetic field, or decreased to produce a stronger electromagnetic field. A wider tag 230 will better diffuse current flow, resulting in the generation of a weaker electromagnetic field. A narrower tag 230 will produce a stronger current concentration, resulting in the generation of a stronger electromagnetic field. These properties can be used to destructively interfere with the electromagnetic field generated by the unopposed portion of the set of layers and/or electromagnetic fields generated by components adjacent to the battery 200.

Referring to FIG. 5B, the tag 230 is configured to generate an electromagnetic field that opposes the electromagnetic field generated by the unopposed portion and an external electrical component 400. As discussed above, the tag 230 is coupled to the lid 220 and provides the terminal 236 at the second end of the tag 230. The tag 230 comprises the curved region 234 and an elongated region 235 having a widened portion at the second end of the tag 230. As shown, the indicator 240 is located on an opposite side of the unopposed portion, defined as the portion of the cathode or anode located between the first tab 116 and the second tab 106. In one aspect, the unopposed portion is disposed away from an external electrical component 400 by utilizing the indicator 240 to orient the unopposed portion away from the external electrical component 400.

The current 310 flowing through the unopposed portion generates a first electromagnetic field. The current 320 flowing through the tag 230 generates a second electromagnetic field. Arranged proximate to the battery 200, is the external electrical component 400 having a current 330 flowing there-through generating a third electromagnetic field. In one aspect, the second electromagnetic field generated by the tag 230 opposes the first electromagnetic field generated by the unopposed portion of the cathode or anode and the third electromagnetic field generated by the electrical component 400, to effectively cancel or mitigate the electromagnetic interference generated by the unopposed portion and the external electrical component 400.

Figure 6:
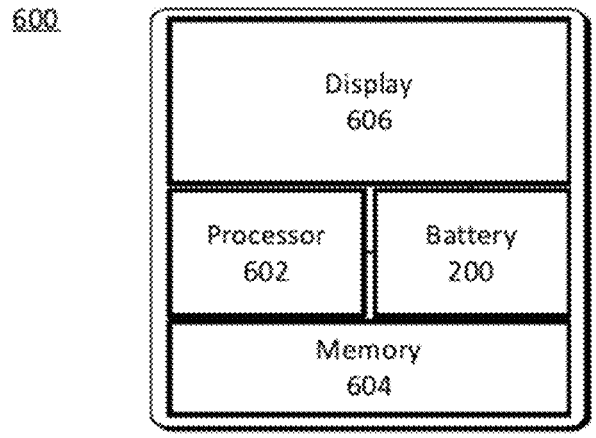
FIG. 6 illustrates a portable electronic device, in accordance with various embodiments of the subject technology.

FIG. 6 illustrates a portable electronic device 600, in accordance with various embodiments of the subject technology. The above-described rechargeable battery 200 can generally be used in any type of electronic device. For example, FIG. 6 illustrates a portable electronic device 600 which includes a processor 602, a memory 604 and a display 606, which are all powered by the battery 200. Portable electronic device 600 may correspond to a laptop computer, tablet computer, mobile phone, personal digital assistant (PDA), digital music player, speaker, watch, and wearable device, and/or other type of battery-powered electronic device. Battery 200 may correspond to a battery pack that includes one or more battery cells. Each battery cell may include a set of layers sealed in an enclosure, including a cathode with an active coating, a separator, and an anode with an active coating. The battery 200 utilizes a tag to mitigate electromagnetic interference and an indicator to indicate an orientation of the unopposed portion with respect to a battery can, as described above.

Figure 7:
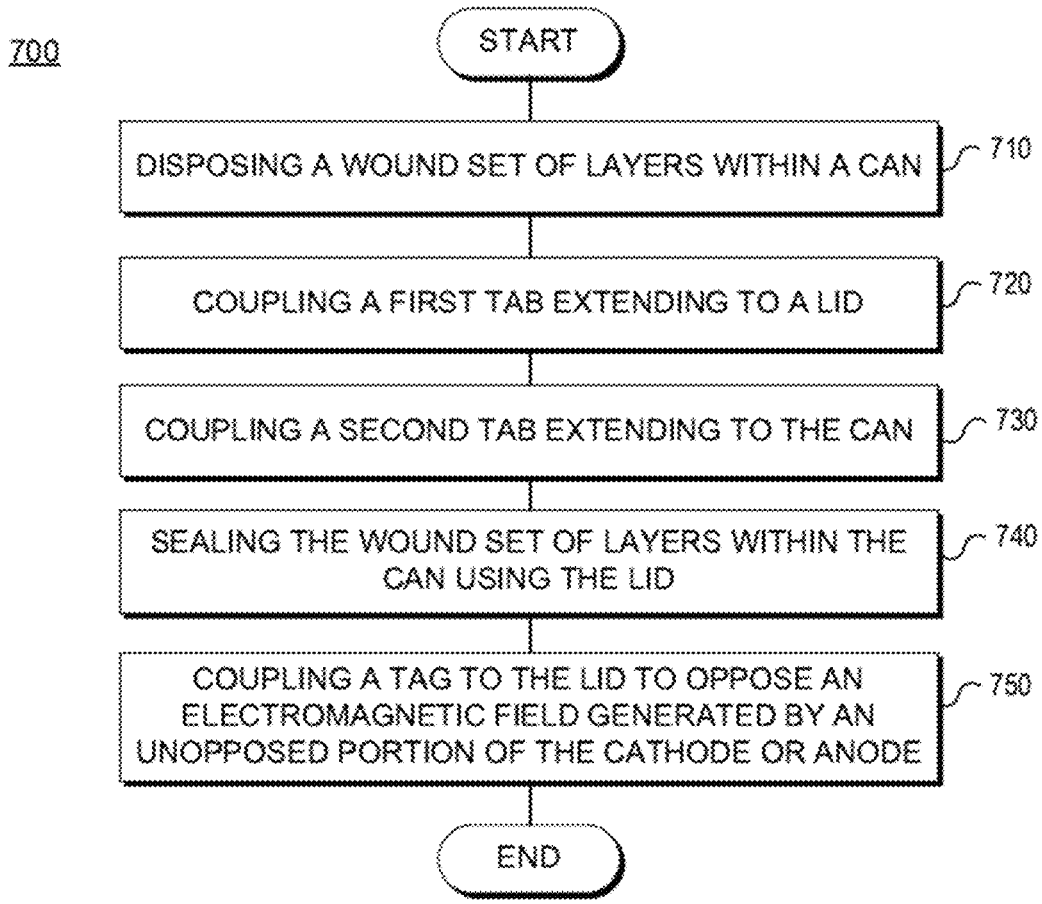
FIG. 7 illustrates an example method for opposing an electromagnetic field generated by an unopposed portion of a cathode or anode, in accordance with various embodiments of the subject technology.

FIG. 7 illustrates an example method 700 for opposing an electromagnetic field generated by an unopposed portion of a cathode or anode, in accordance with various embodiments of the subject technology. It should be understood that, for any process discussed herein, there can be additional, fewer, or alternative steps performed in similar or alternative orders, or in parallel, within the scope of the various embodiments unless otherwise stated.

At operation 710, a wound set of layers are disposed within a can. The set of layers comprise a cathode, an anode, and a separator disposed between the cathode and the anode. At operation 720, a first tab extending from one of the cathode and anode is coupled to a lid. The lid may comprise an indicator to indicate a location of an unopposed portion of the cathode or anode with respect to the can. The indicator may comprise at least one of an indent, mark, and scribe. At operation 730, a second tab extending from the other of the cathode and anode is coupled to the can. At operation 740, the wound set of layers are sealed within the can using the lid. At operation 750, a tag is coupled to the lid. The tag is coupled to the lid at a first end and provides a terminal at a second end opposite the first end. The terminal extends beyond a periphery of the lid. The tag may further comprise a curved region and an elongated region disposed between the first and second ends.

As discussed above, the unopposed portion of the cathode or anode generates a first electromagnetic field. The tag coupled to the lid, generates a second electromagnetic field to oppose the first electromagnetic field, thereby eliminating or mitigating electromagnetic interference.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A battery, comprising:
a wound set of layers comprising a cathode, an anode, and a separator disposed between the cathode and the anode, wherein the cathode and the anode have different lengths;
a can housing the wound set of layers;
a lid disposed atop of the can to enclose the wound set of layers within the can;
a first tab extending from one of the cathode and anode, the first tab coupled to the lid;
a second tab extending from the other of the cathode and anode, the second tab coupled to the can;
a tag coupled to the lid;
wherein a current flowing through an unopposed portion of the cathode or anode generates a first electromagnetic field; and
wherein the current flowing through the tag generates a second electromagnetic field, wherein the second electromagnetic field opposes the first electromagnetic field.

2. The battery of claim 1, wherein the tag comprises a terminal at an end of the tag, the terminal extending beyond a periphery of the lid.

3. The battery of claim 1, wherein the tag is coupled to the lid at a first end and provides a terminal at a second end opposite the first end.

4. The battery of claim 3, wherein the tag comprises a curved region between the first and second ends.

5. The battery of claim 4, wherein the tag comprises an elongated region between the first and second ends.

6. The battery of claim 1, wherein the lid comprises an indicator, the indicator corresponding to a location of the unopposed portion with respect to the can.

7. The battery of claim 6, wherein the indicator comprises at least one of an indent, mark, and scribe.

8. A portable electronic device, comprising:
a battery comprising:
a wound set of layers comprising a cathode, an anode, and a separator disposed between the cathode and the anode, wherein the cathode and the anode have different lengths;
a can housing the wound set of layers;
a lid disposed atop of the can to enclose the wound set of layers within the can;
a first tab extending from one of the cathode and anode, the first tab coupled to the lid;
a second tab extending from the other of the cathode and anode, the second tab coupled to the can;
a tag coupled to the lid;
wherein a current flowing through an unopposed portion of the cathode or anode generates a first electromagnetic field;
wherein the current flowing through the tag generates a second electromagnetic field;
an electrical component disposed adjacent to the battery, the electrical component generating a third electromagnetic field; and
wherein the second electromagnetic field opposes the first electromagnetic field and the third electromagnetic field.

9. The portable electronic device of claim 8, wherein the tag comprises a terminal at an end of the tag, the terminal extending beyond a periphery of the lid.

10. The portable electronic device of claim 8, wherein the tag is coupled to the lid at a first end and provides a terminal at a second end opposite the first end.

11. The portable electronic device of claim 10, wherein the tag comprises a curved region between the first and second ends.

12. The portable electronic device of claim 8, wherein the lid comprises an indicator, the indicator corresponding to a location of the unopposed portion with respect to the can.

13. The portable electronic device of claim 12, wherein the indicator comprises at least one of an indent, mark, and scribe.

14. A method for opposing an electromagnetic field generated by an unopposed portion of a cathode or anode, the method comprising:
disposing a wound set of layers within a can, the set of layers comprising a cathode, an anode, and a separator disposed between the cathode and the anode, wherein the cathode and the anode have different lengths;

coupling a first tab extending from one of the cathode and anode to a lid;

coupling a second tab extending from the other of cathode and anode to the can;

sealing the wound set of layers within the can using the lid;

coupling a tag to the lid;

wherein a current flowing through an unopposed portion of the cathode or anode generates a first electromagnetic field; and wherein the current flowing through the tag generates a second electromagnetic field, wherein the second electromagnetic field opposes the first electromagnetic field.

15. The method of claim 14, wherein the tag comprises a terminal at an end of the tag, the terminal extending beyond a periphery of the lid.

16. The method of claim 14, wherein the tag is coupled to the lid at a first end and provides a terminal at a second end opposite the first end.

17. The method of claim 16, wherein the tag comprises a curved region between the first and second ends.

18. The method of claim 17, wherein the tag comprises an elongated region between the first and second ends.

19. The method of claim 14, wherein the lid comprises an indicator, the indicator corresponding to a location of the unopposed portion with respect to the can.

20. The method of claim 19, wherein the indicator comprises at least one of an indent, mark, and scribe.

* * * * *